United States Patent
Wu et al.

(10) Patent No.: US 8,058,857 B2
(45) Date of Patent: Nov. 15, 2011

(54) DIGITALLY CONTROLLED SWITCHED-MODE POWER SUPPLY

(75) Inventors: Chi-Hao Wu, Taipei (TW); Chern-Lin Chen, Sindian (TW)

(73) Assignee: Grenergy Opto, Inc., Hsinchu Science Park, Hsinchu (TW)

( * ) Notice: Subject to any disclaimer, the term of this patent is extended or adjusted under 35 U.S.C. 154(b) by 542 days.

(21) Appl. No.: 12/360,949

(22) Filed: Jan. 28, 2009

(65) Prior Publication Data

US 2010/0188063 A1     Jul. 29, 2010

(51) Int. Cl.
*G05F 1/40*     (2006.01)
(52) U.S. Cl. .......... 323/283; 323/322; 323/351
(58) Field of Classification Search .......... 323/241, 323/282–285, 322, 351
See application file for complete search history.

(56) References Cited

U.S. PATENT DOCUMENTS

| | | | | |
|---|---|---|---|---|
| 5,063,489 A | * | 11/1991 | Inaba | 363/21.05 |
| 5,943,227 A | * | 8/1999 | Bryson et al. | 363/95 |
| 6,005,377 A | * | 12/1999 | Chen et al. | 323/283 |
| 6,563,718 B1 | * | 5/2003 | Li et al. | 363/16 |
| 6,919,715 B2 | * | 7/2005 | Muratov et al. | 323/285 |
| 6,940,189 B2 | * | 9/2005 | Gizara | 307/151 |
| 7,990,122 B2 | * | 8/2011 | Sase et al. | 323/283 |
| 2010/0149845 A1 | * | 6/2010 | Wu et al. | 363/126 |

FOREIGN PATENT DOCUMENTS

CN     2692915 Y     4/2005

* cited by examiner

*Primary Examiner* — Jessica Han
(74) *Attorney, Agent, or Firm* — Winston Hsu; Scott Margo

(57) ABSTRACT

The present invention relates to a digitally controlled switched-mode power supply, wherein a switched-mode power supply is provided with a control circuit, which comprises a signal amplifier unit able to receive digital signals or analog signals and a switching controller able to receive the signals. The switching controller uses the signals to produce a clock signal, after which the clock signal is output, whereupon the signal amplifier unit feeds a signal back to control the switching controller. The signal amplifier unit is provided with at least one amplifier element, and when the amplifier element receives a digital signal or analog signal, then the signal is transmitted to the switching controller. Accordingly, the control circuit achieves the effectiveness to not only receive and transmit digital signals, but also receive and transmit analog signals, and is thus provided with the advantage of enormous flexibility.

8 Claims, 4 Drawing Sheets

DIGITALLY CONTROLLED SWITCHED-MODE POWER SUPPLY

BACKGROUND OF THE INVENTION (a) Field of the Invention

The present invention provides a digitally controlled switched-mode power supply, and more particularly provides a digitally controlled switched-mode power supply which is not limited to digital signals but also enables the input of analog signals.

(b) Description of the Prior Art

It can be said that modern technology continually strives for advancement, and there has been continuous progress in electric circuits from the large-scale electric circuits of old to the micro electric circuits of modern times, wherein analog control circuits were adopted for transmission in early electric circuits, until the present stage of advancement enabled digital control circuits to be adopted. Taking a power supply as an example, and referring to FIG. 1 and FIG. 2, which show a block diagram and a circuit diagram respectively of a switched-mode power supply of the prior art, and it can be clearly seen from the drawings that a control circuit 1 is provided with a rectifier unit 11. The rectifier unit 11 transmits a signal to a switching controller 13 through a voltage transformer unit 12, whereupon the switching controller 13 carries out a comparative analysis of the signal, and a frequency generator 131 produces a clock signal with a specific width from the aforementioned comparative signal, which is then output. Furthermore, an optical coupling unit 14 is disposed before the specific signal, and the optical coupling unit 14 is connected to an amplifier and feedback unit (voltage regulator) 15. The amplifier and feedback unit (voltage regulator) 15 is provided with the functionality to detect voltage, and immediately regulates the voltage when excessively high, while simultaneously controlling the size of the flow of current, thereby achieving a regulating objective, and enabling controlling the entire output structure, such as voltage.

However, the following problems and shortcomings are still in need of improvement when using the aforementioned switched-mode power supply of the prior art:

1. Because the control circuit 1 adopts an amplifier and feedback component (voltage regulator) (TL431), thus, it is unable to accurately control the system, such as the voltage state, and so on.

2. Power consumption of the control circuit 1 is considerably large, and is thus unable to achieve a power saving objective.

Hence, it is the strong desire of the inventor and manufacturers engaged in related art and purpose of the present invention to research, improve and resolve the problems and shortcomings of the aforementioned prior art.

SUMMARY OF THE INVENTION

Hence, in light of the shortcomings of the aforementioned prior art, the inventor of the present invention, having collected related data, and through evaluation and consideration from many aspects, as well as having accumulated years of experience in related arts, through continuous testing and improvements has designed a new digitally controlled switched-mode power supply as disclosed in the present invention which is not limited to digital signals but also enables the input of analog signals.

A primary objective of the present invention lies in: A control circuit comprises a signal amplifier unit and a switching controller, wherein the signal amplifier unit comprises at least one amplifier element. The amplifier element is provided with the functionality to receive external digital signals or analog signals and then transmit the signals to the switching controller, whereupon the switching controller compares the signals. Moreover, the switching controller is provided with a comparator unit, a frequency generator unit, a control logic unit and an output buffer unit, wherein, after the signal amplifier unit transmits a signal to the switching controller, then the comparator unit within the switching controller compares the signal with a waveform, while the frequency generator unit produces a frequency, after which the signal and frequency are integrated through the control logic unit to produce a clock signal of specific width, which is then output from the output buffer unit. Accordingly, the present invention enables achieving effective control of a control circuit no matter whether digital signals or analog signals are used, thereby achieving substantially greater selectivity, and providing the present invention with the advantages of power saving and accurate detection of voltage signals.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
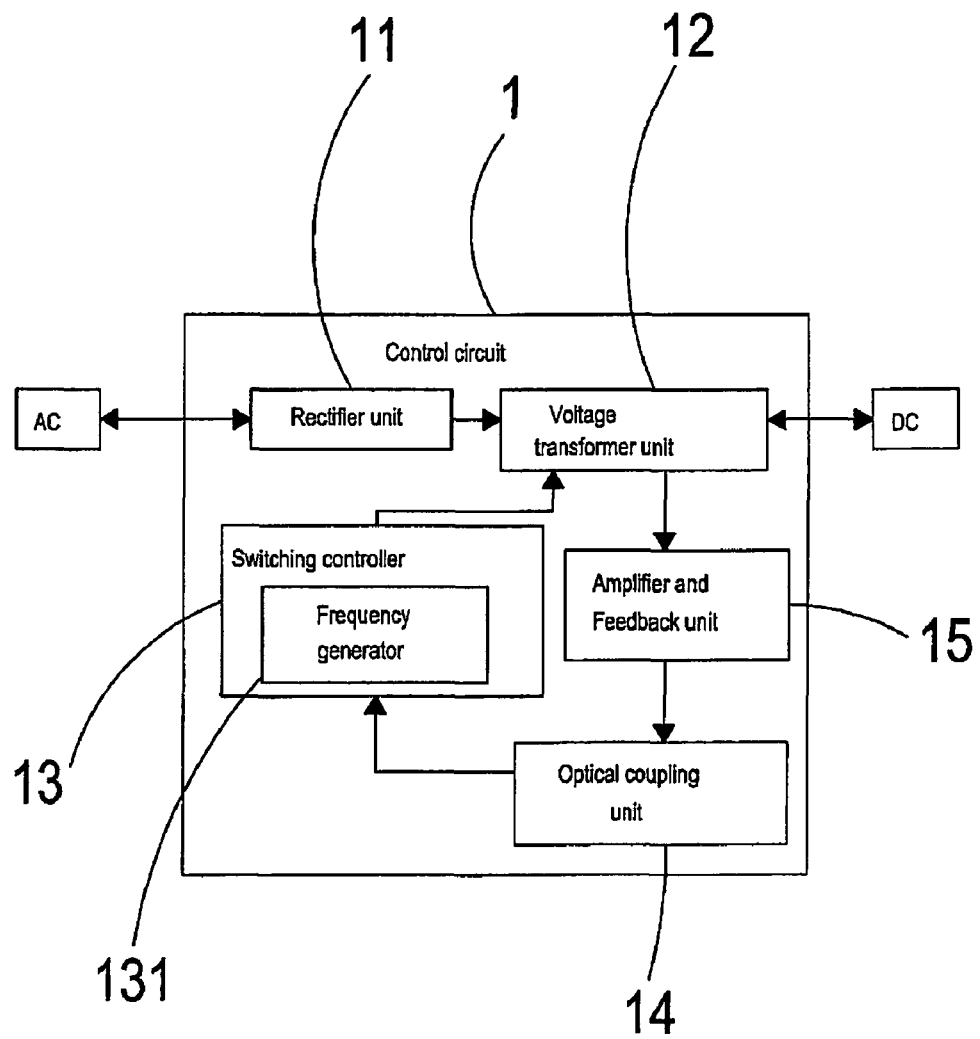
FIG. 1 is a block diagram of a switched-mode power supply of the prior art.
Figure 2:
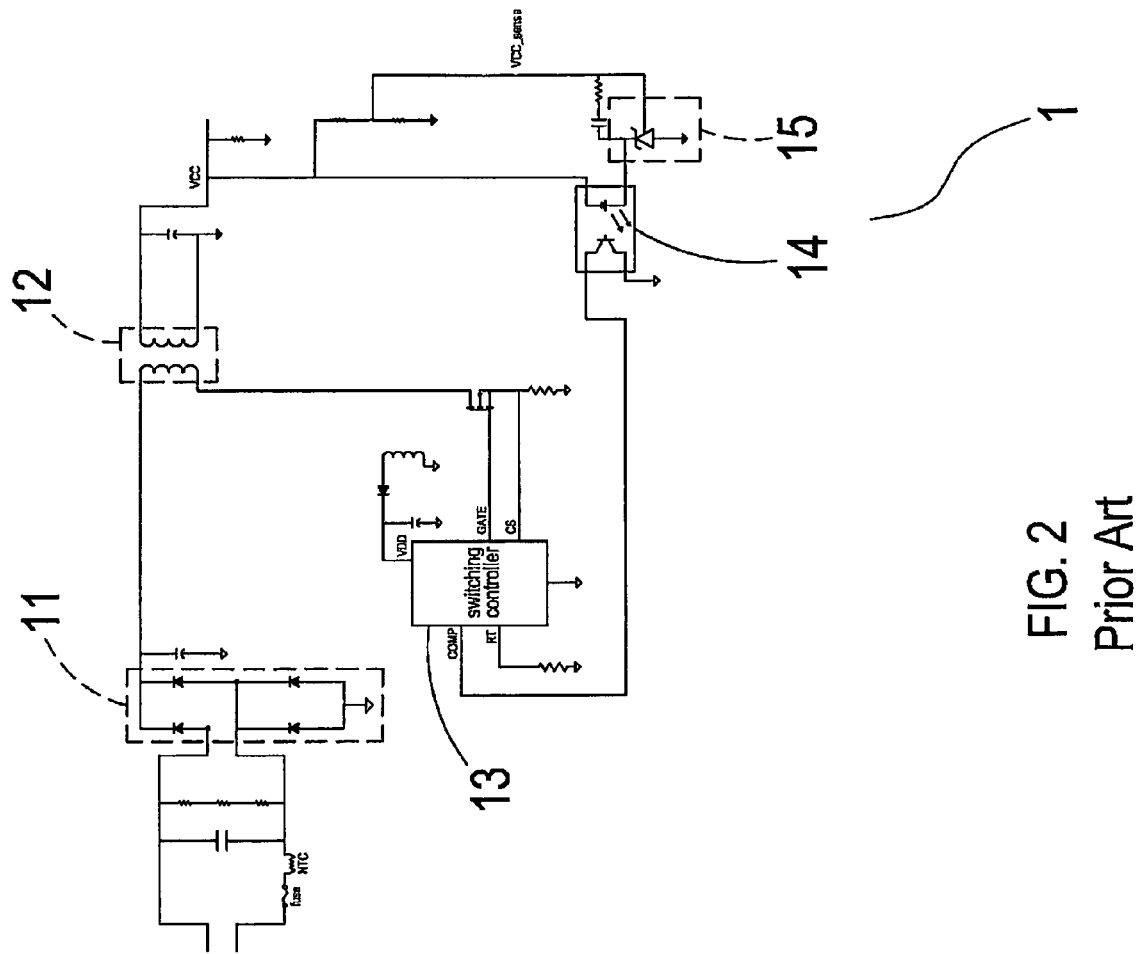
FIG. 2 is a circuit diagram of the switched-mode power supply of the prior art.
Figure 3:
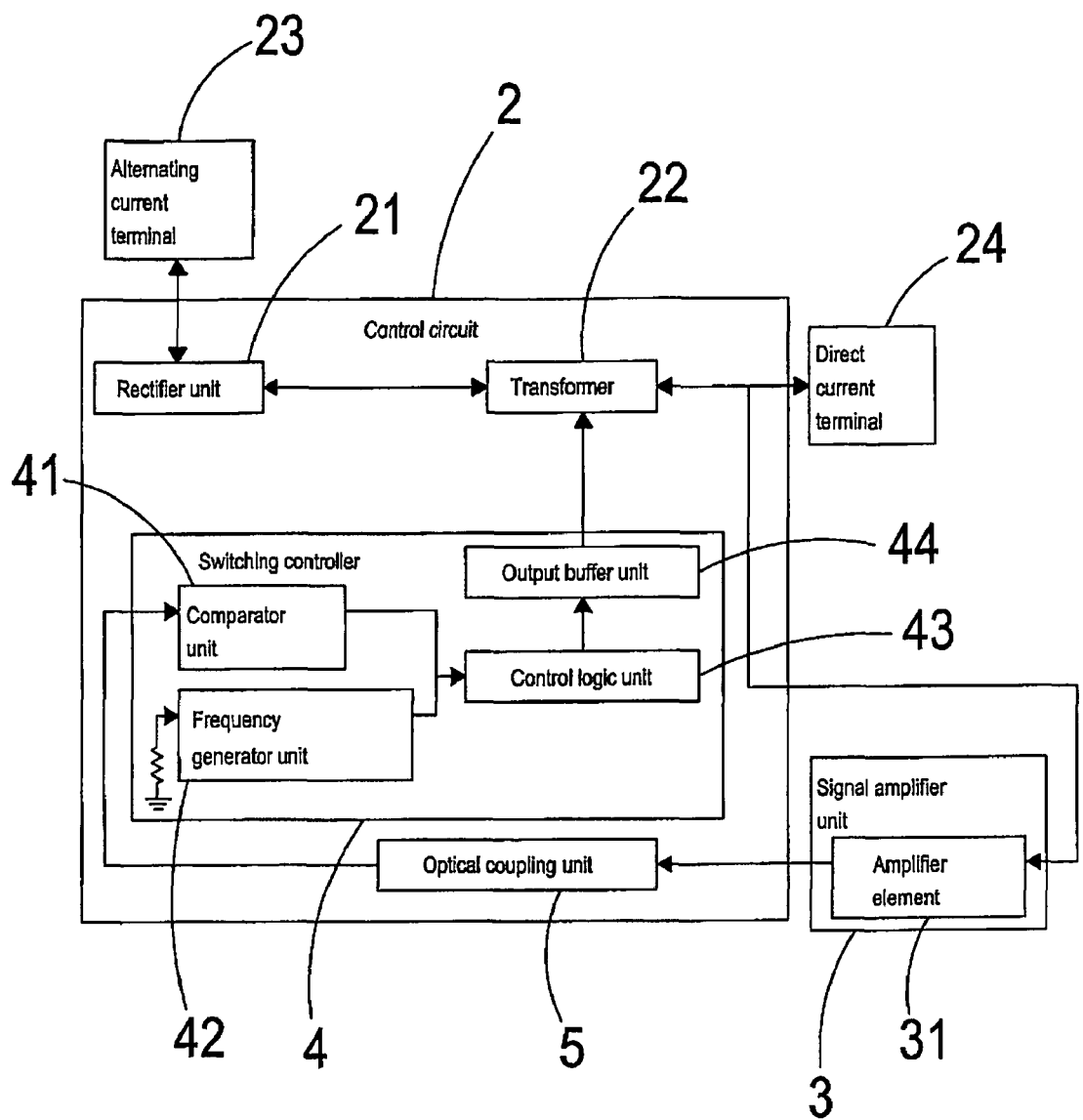
FIG. 3 is a block diagram of a preferred embodiment of the present invention.
Figure 4:
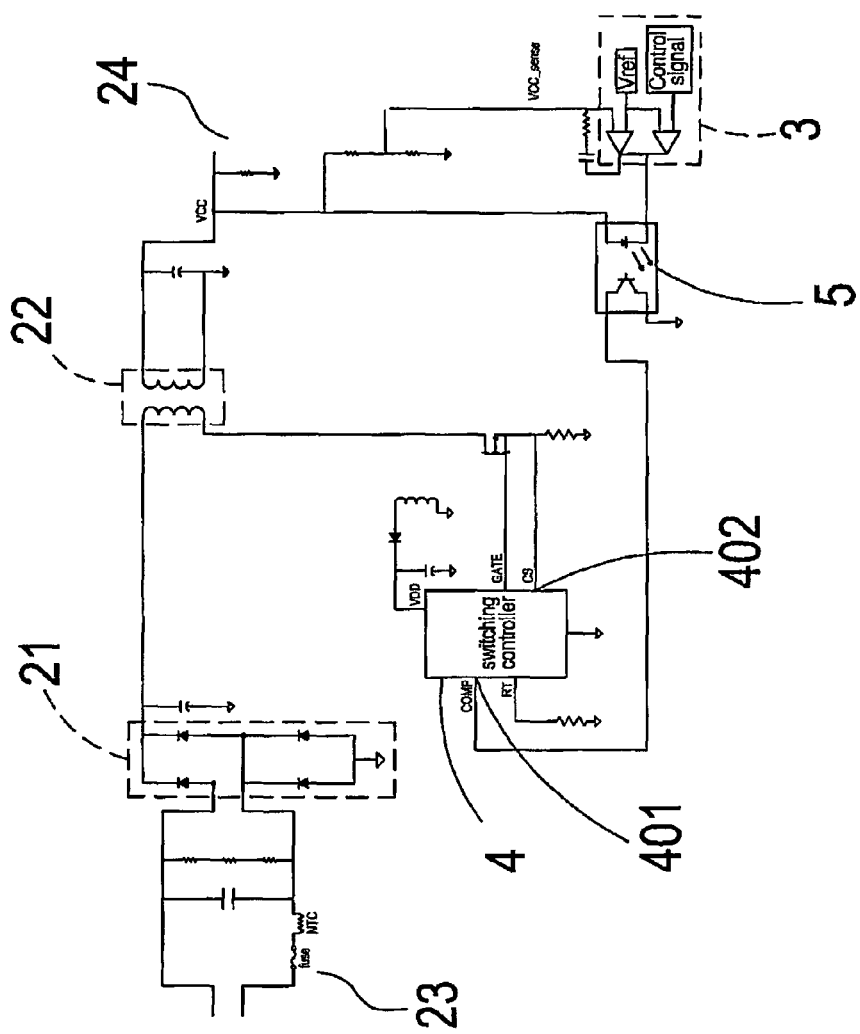
FIG. 4 is a circuit diagram of the preferred embodiment of the present invention.

Referring to FIG. 3 and FIG. 4, which show a block diagram and a circuit diagram respectively of a preferred embodiment the present invention, and it can be clearly seen from the drawings that a switched-mode power supply is provided with a control circuit 2, and the control circuit 2 is provided with at least one input end. The input ends are respectively an alternating current terminal 23 and a direct current terminal 24. The control circuit 2 comprises:

A signal amplifier unit 3, the signal amplifier unit 3 being able to receive control signals, which are digital signals or analog signals, wherein the signal amplifier unit 3 is internally provided with at least one amplifier element 31 used to receive the aforementioned signals, and the amplifier element 31 is an OP (operational) amplifier;

A switching controller 4, the switching controller 4 being able to receive signals coming from the signal amplifier unit 3 and produces a clock signal, after which the clock signal is output, at the same time the switching controller 4 delivers a signal to the signal amplifier unit 3, whereupon the signal amplifier unit 3 feeds a signal back to control the switching controller 4. Moreover, the control circuit 2 is further provided with a rectifier unit 21 and a transformer 22, wherein the rectifier unit 21 is a bridge rectifier.

Furthermore, the switching controller 4 comprises:

A comparator unit 41, the comparator unit 41 being used to compare voltage signals coming from the signal amplifier unit 3;

A frequency generator unit 42, the frequency generator unit 42 being able to produce a frequency signal from an externally connected electronic component;

A control logic unit 43, the control logic unit 43 being able to determine the signals coming from the comparator unit 41 and the frequency generator unit 42 and produce a clock signal of a specific width; and An output buffer unit 44, the output buffer unit 44 being able to output the aforementioned clock signal.

Furthermore, an optical coupling unit 5 is located between the signal amplifier unit 3 and the switching controller 4.

Referring again to FIG. 3 and FIG. 4, which shows the circuit diagram of the preferred embodiment of the present invention, and it can be clearly seen from the drawing that the control circuit 2 comprises the signal amplifier unit 3 and the switching controller 4, with the control circuit 2 being further provided with the alternating current terminal 23 and the direct current terminal 24, wherein the alternating current terminal 23 is connected to the rectifier unit 21, and the rectifier unit 21 is connected to the transformer 22. The signal amplifier unit 3 is electrically connected to the direct current terminal 24, with the signal amplifier unit 3 being provided with the functionality to be able to receive digital signals or analog signals, while at the same time being able to accurately detect voltage values. When the switching controller 4 transmits voltage to the signal amplifier unit 3, then the signal amplifier unit 3 feeds a signal back to control the switching controller 4. Furthermore, an optical coupling unit 5 is located between the signal amplifier unit 3 and the switching controller 4. Accordingly, when the signal amplifier unit 3 is used with the control circuit 2, then the signal amplifier unit 3 is made to connect with a pin (COMP (Comparator)) 401 of the switching controller, whereupon voltage at the pin (COMP) 401 changes along with the changes in the load or the exchange input voltage, and the peak of a waveform (CS (Control Strobe)) 402 interferes with that of the pin (COMP) 401 to determine the opening gate width, thereby regulating the aforementioned change and achieving a stabilized voltage.

Furthermore, the signal amplifier unit 3 is internally provided with at least one amplifier element 31, and the amplifier element 31 is able to receive external control signals, which can be digital signals or analog signals, after which the control signals are transmitted to the switching controller 4 through the signal amplifier unit 3.

Hence, the key factors that enable the digitally controlled switched-mode power supply of the present invention to improve on the prior art are described as follows:

Use is made of two of the amplifier elements 31 to receive control signals, which can be digital signals or analog signals, and after the amplifier elements 31 receive the signals, then the signals are immediately transmitted to the switching controller 4 for processing. Accordingly, the present invention not only achieves the effectiveness of not being limited to the input of digital signals, but is also able to input analog signals, thereby providing enormous selectivity.

In conclusion, the digitally controlled switched-mode power supply of the present invention is clearly able to achieve the effectiveness and objectives as disclosed when in use, and is indeed a practical and exceptional invention that complies with the essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A digitally controlled switched-mode power supply, wherein a switched-mode power supply is provided with a control circuit, and the control circuit comprises:
    a signal amplifier unit, and the signal amplifier unit enables receiving control signals, the control signals being digital signals or analog signals, moreover, the signal amplifier unit is internally provided with at least one amplifier element used to receive the signals; and
    a switching controller, and the switching controller receives the signals coming from the signal amplifier unit and produces a clock signal, after which the clock signal is output, while at the same time the switching controller delivers a signal to the signal amplifier unit, whereupon the signal amplifier feeds back a signal to control the switching controller.

2. The digitally controlled switched-mode power supply according to claim 1, wherein the switching controller comprises:
    a comparator unit, and the comparator unit is used to compare voltage signals coming from the signal amplifier unit;
    a frequency generator unit, and the frequency generator unit enables producing a frequency signal from an externally connected electronic component;
    a control logic unit, and the control logic unit enables determining the signals coming from the comparator unit and the frequency generator unit and produce a clock signal of a specific width; and
    an output buffer unit, and the output buffer unit enables outputting the clock signal.

3. The digitally controlled switched-mode power supply according to claim 1, wherein an optical coupling unit is located between the signal amplifier unit and the switching controller.

4. The digitally controlled switched-mode power supply according to claim 1, wherein the control circuit is further provided with a rectifier unit and a transformer.

5. The digitally controlled switched-mode power supply according to claim 1, wherein the control circuit is provided with at least one input terminal.

6. The digitally controlled switched-mode power supply according to claim 5, wherein the input terminals are respectively an alternating current terminal and a direct current terminal.

7. The digitally controlled switched-mode power supply according to claim 4, wherein the rectifier unit is a bridge rectifier.

8. The digitally controlled switched-mode power supply according to claim 1, wherein the amplifier element is an OP (operational) amplifier.

* * * * *